United States Patent [19]

Shatila

[11] 4,259,051
[45] Mar. 31, 1981

[54] EXTRUSION APPARATUS FOR FOOD MATERIAL

[75] Inventor: Mounir A. Shatila, Blackfoot, Id.

[73] Assignee: Ampco Foods Inc., San Francisco, Calif.

[21] Appl. No.: 37,833

[22] Filed: May 10, 1979

[51] Int. Cl.³ .............................................. A21C 11/16
[52] U.S. Cl. ................................ 425/133.1; 99/450.6; 426/94; 426/503; 426/516
[58] Field of Search .................. 425/133.1, 131.1, 130; 426/94, 498, 503, 516; 156/244.12, 244.13; 99/450.6, 450.7

[56] References Cited

U.S. PATENT DOCUMENTS

| 3,541,946 | 11/1970 | Johnston | 425/133.1 |
| 3,615,675 | 10/1971 | Fowler et al. | 426/94 |
| 3,751,202 | 8/1973 | Coleman et al. | 425/133.1 |
| 3,806,290 | 4/1974 | Graff | 425/133.1 |

Primary Examiner—Jeffery R. Thurlow
Attorney, Agent, or Firm—Martin G. Mullen

[57] ABSTRACT

An apparatus for extruding pumpable materials comprising an outer conduit means connected to a material supply source said outer conduit means being arranged around two inner conduit means one of which is connected to another material supply source and the other of which is in communication with the ambient. A method for extruding one material to surround another material comprising extruding one material into a hollow extrusion to surround a supply of another material filling the center of the extrusion whereby air contained in the center of the extrusion is displaced to the ambient.

5 Claims, 2 Drawing Figures

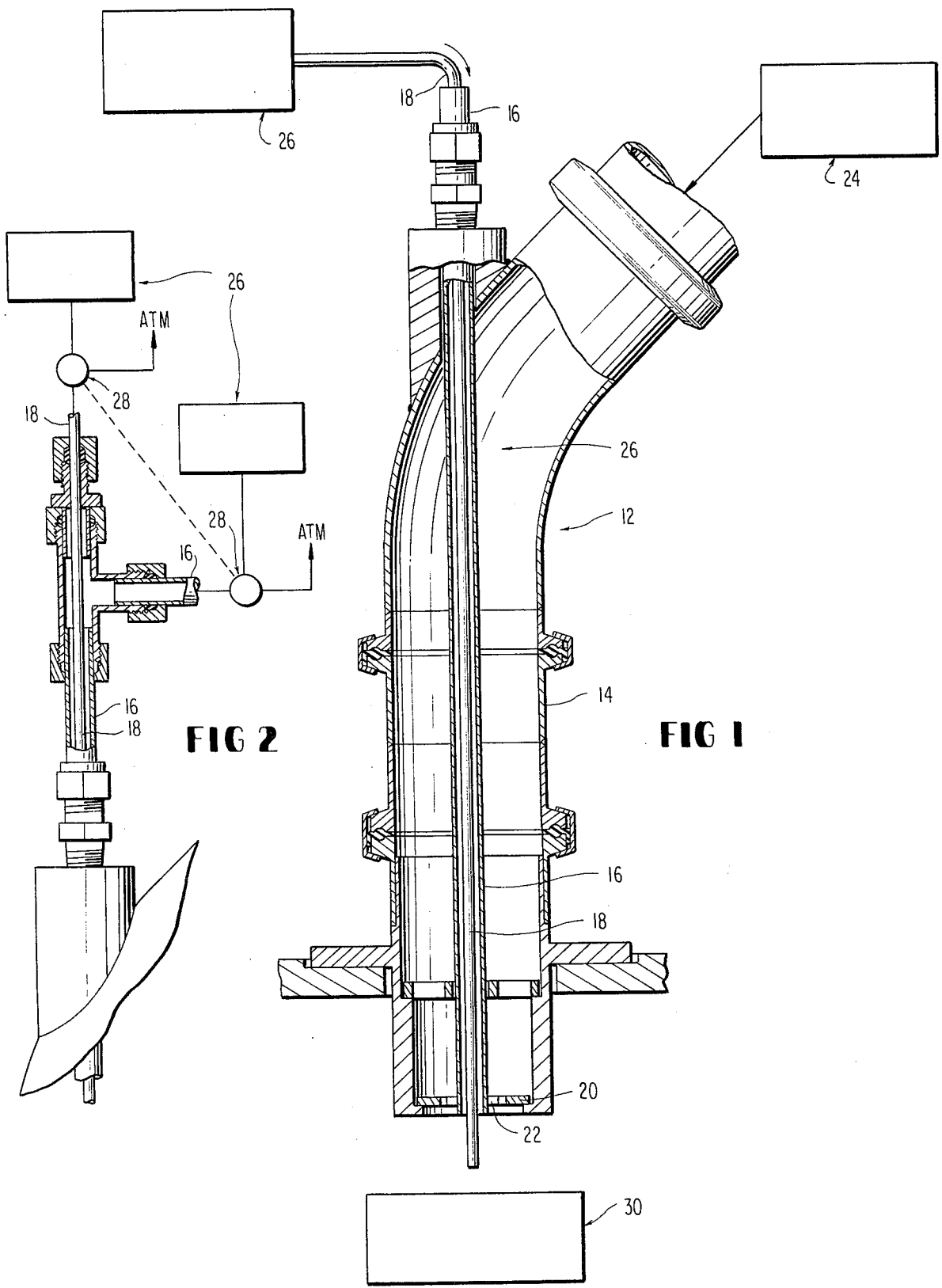

EXTRUSION APPARATUS FOR FOOD MATERIAL

BACKGROUND OF THE INVENTION

1. Field of the Invention

The invention relates to a novel apparatus and method for extruding one material to surround a supply of another material.

2. Description of the Prior Art

U.S. Pat. No. 3,615,675 discloses an extruder that produces a dough tube filled with a suitable food material which is divided into pieces. U.S. Pat. No. 3,541,946 discloses a device for forming a cereal shell and simultaneously filling the shell with a suitable filler. The continuous tube of cereal material is then divided into pieces. U.S. Pat. No. 3,513,504 discloses a annular die for forming theremoplastic sheets; there is an air passage centrally of the die for expanding the formed tubular plastic structure.

SUMMARY OF THE INVENTION

The present invention provides an improved method and apparatus for extruding one material to surround another material An extruder is arranged to comprise an outer conduit means and two inner conduit means. Plastic material is extruded through the outer conduit means around the inner conduit means to form an initially hollow extrusion while the hollow center of the extrusion is being simultaneously supplied with another material through one of the two inner conduit means. The extrusion is subsequently divided into pieces in a manner by which the ends of pieces and the end of the extrusion are sealed to surround the other material filling their centers. The other of the two inner conduit means is open to the atmosphere to permit air to escape from within the center of the extrusion being filled with another food material.

This mode of operation prevents the intended shape of the extrusion from becoming distorted which is a principle object of the present invention. Contributing to the achievement of the foregoing object is the other of the two inner conduit means which is not connected to a material supply source but which is open to the atmosphere. The arrangement of this conduit means in the extruder system effectively prevents the material from collapsing as it exits the extruder. It also enables the other material to be simultaneously supplied to the center of the extrusion using substantially less pressure. In this way the previously closed end of the extrusion does not have a tendency to rupture as the other material is pumped to its center.

BRIEF DESCRIPTION OF THE DRAWINGS

FIG. 1 is an elevational view partially in section of the extruder of the present invention.

FIG. 2 is a fragmentary view partially in section of the preferred adaptations of the inner tubes of the extruder of FIG. 1 to material supply sources and to the atmosphere.

DESCRIPTION OF THE PREFERRED EMBODIMENT

Referring to the drawings reference numberal 12 indicates the extruder of the present invention which includes an outer 14 conduit means and two inner conduit means referred to as an intermediate conduit means 16 and inner conduit means 18. As shown conduit means 14, 16 and 18 are preferably concentrically arranged. A die plate 20 having an orifice 22 is mounted to the discharge end of outer conduit means 14. The orifice 20 is preferably fluted but may assume any desired shape. The inlet end of conduit means 14 is adapted to be connected to a material supply source 24. As shown conduit means 16 and 18 extend from within the extrusion chamber 26 defined by an entrance end, conduit means 14 and die plate 20 through orifice 22. Inner conduit means 18 preferably extends beyond intermediate conduit means 16. The opposite ends of conduit means 16 and 18 are adapted to be open to the atmosphere and connected to another material supply source 26, respectively. Referring to FIG. 2, it is shown that each of conduit means 16 and 18 are adapted to be alternatively connected to another material supply source and open to the atmosphere, respectively. This may be accomplished by using mechanical switches 28. In this way, for example, when conduit means 16 is switched from being connected to material supply source 26 to being open to the atmosphere, conduit means 18 is switched from being open to the atmosphere to being connected to material supply source 26. Positioned below extruder 12 is cutter mechanism 30 which simultaneously divides the extrusion into pieces while closing the ends thereof. By conduit means is meant any pipe, tube or passage for conveying a material.

Plastic material, such as a dough, from material supply source 24, is extruded through conduit means 14 and out orifice 22 of die plate 20 around conduit means 16 and 18 into an initially hollow extrusion. In the embodiment being described conduit means 16 is open to the atmosphere. Another material, such as jelly, ketchup, or sour cream, is simultaneously pumped from a supply source 26 through conduit means 18 into the center of the initially hollow extrusion. As the another material fills the hollow center of the extrusion air is vented from the center of the extrusion to the atmosphere through conduit means 16. Mounted a predetermined distance from the die plate in the path of the extrusion is a cutter mechanism 30 which simultaneously divides the extrusion tube into individual pieces while closing the ends thereof. In this way, the end of the extrusion tube from which a piece has divided is closed to a substantially sealed condition so as to contain the another material being supplied thereto.

What is claimed is:

1. An extrusion apparatus for food material comprising an outer conduit means adapted to be connected at its inlet to a dough material supply source, a die plate means having an orifice mounted in connection to the discharge end of said outer conduit means, and two inner conduit means arranged substantially along the longitudinal axis within said outer conduit means, one of said inner conduit means being adapted to be connected to another food material supply source.

2. The apparatus of claim 1 wherein said conduit means are concentrically arranged along the longitudinal axis extending from the discharge end of said outer conduit means as outer, intermediate and inner conduit means.

3. The apparatus of claim 2 wherein said inner conduit means extends beyond said intermediate conduit means through said orifice of said die plate.

4. The apparatus of claim 2 wherein said inner conduit means is adapted to be connected to another material supply source and said intermediate conduit means is adapted to be open to the atmosphere.

5. The apparatus of claim 4 in combination with said material supply source in fluid communication with said outer conduit means and said another material supply source in fluid communication with said inner conduit means and said intermediate conduit means is in communication with the atmosphere.

* * * * *